United States Patent Office 3,195,474
Patented July 20, 1965

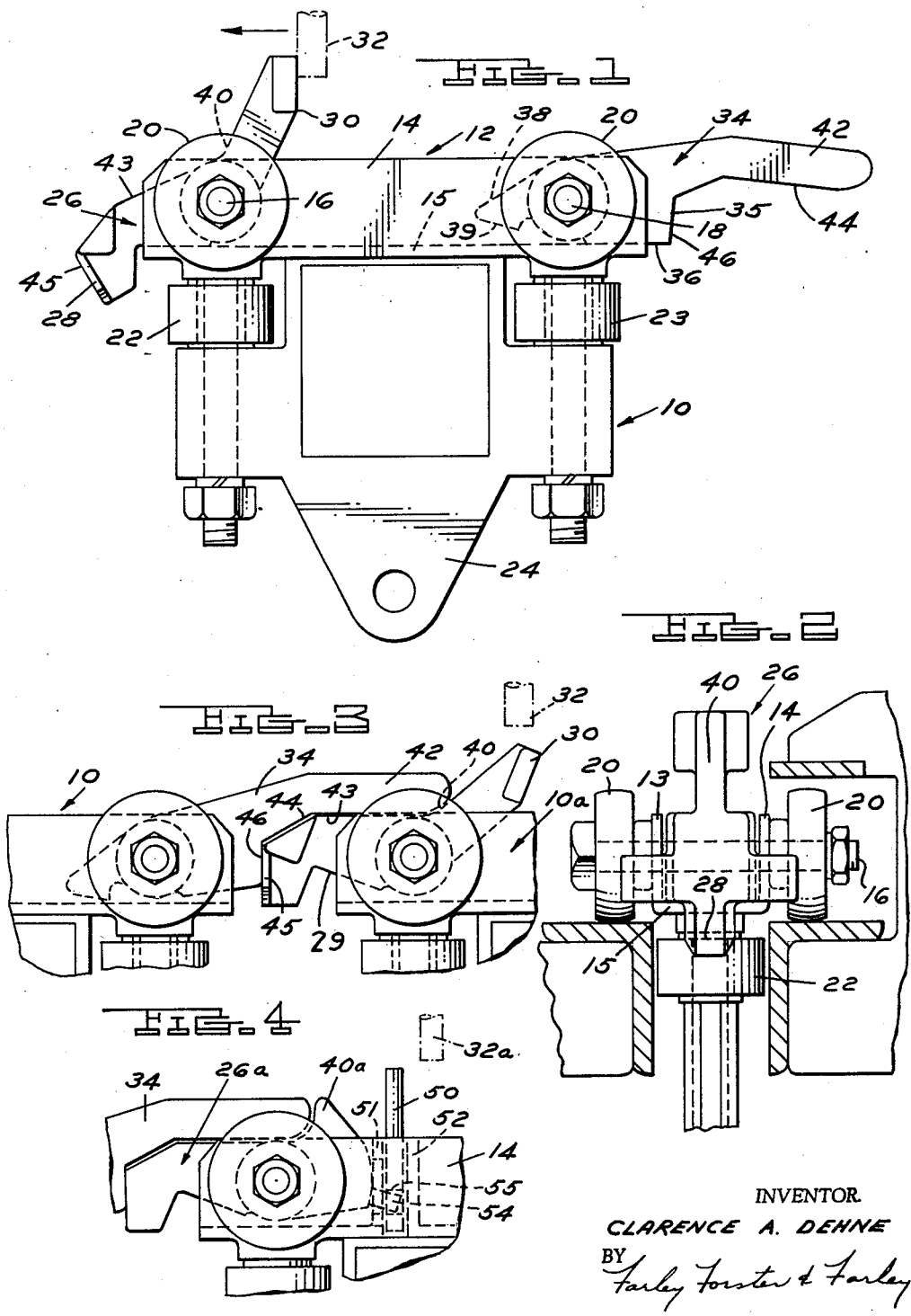

3,195,474
RELEASING DOG CARRIERS AND TROLLEYS FOR CONVEYOR SYSTEMS
Clarence A. Dehne, Garden City, Mich., assignor to Jervis B. Webb Company, Detroit, Mich., a corporation of Michigan
Filed Aug. 12, 1963, Ser. No. 301,380
8 Claims. (Cl. 104—172)

This invention relates to an improved construction for a carrier or a trolley for use in a conveyor system of the type where such components are equipped with a driving dog movable between driving and non-driving positions relative to a pusher of a driveline. The present construction automatically moves the driving dog of a following trolley or carrier to non-driving position when it overtakes a leading trolley or carrier.

A conveyor trolley constructed in accordance with the invention preferably has a body including a pair of spaced vertical side walls, a transverse web connecting the side walls with forward and rearward wheel axles mounted between the side walls, a driving dog, a driving dog positioning member pivotally mounted on the forward wheel axle between the body side walls and having a counterweight portion forwardly of the wheel axle adapted to pivot the positioning member about the axle to a normal position defined by engagement between a lower surface on the counterweight portion and the transverse body web, a crank portion on the dog positioning member extending generally radial to the wheel axle; a dog depressing member pivotally mounted on the rearward wheel axle and having a rearwardly extending counterweighted heel portion for pivoting the dog depressing member to a normal position defined by engagement between a bottom surface on the heel portion and the transverse body web, a forwardly extending toe portion engageable with the transverse body web for limiting pivotal movement of the dog depressing member in the opposite direction and the dog depressing member including a spur projecting rearwardly of the trolley body. Complementary shaped surfaces are provided on the rear and lower portion of the spur of the dog depressing member and front upper portion of the dog positioning member so that when a following trolley overtakes an immediately preceding trolley the end of the spur portion of the dog depressing member of the preceding trolley is guided into engagement with the crank portion of the dog positioning member of the following trolley to move the latter member to non-driving position, the limit of such movement being defined by overlapping abutting engagement between the complementary surfaces of the depressing and positioning members.

In one form of the construction the driving dog is formed integrally with the dog positioning member and pivots between the driving and non-driving position, this construction being suitable for use in conjunction with a driveline equipped with spring type pushers.

In another form of construction the driving dog is mounted between the side walls of the trolley body for vertical sliding movement and means are included on the dog positioning member and driving dog for moving the driving dog vertically when the dog positioning member pivots, this construction being suitable for use with rigid pushers on a driveline.

Where a carrier exceeds the length of a trolly or includes a plurality of trolleys, the dog depressing member is mounted on the rear end of the carrier or on the rear trolley thereof and the dog positioning member is mounted adjacent the front end of the following carrier or on the front trolley thereof so that when a following carrier overtakes a leading carrier the dog positioning member of the following carrier is engaged by the spur of the dog depressing member of the leading carrier and moved to non-driving position as defined by abutment between the complementary surfaces of the two members.

The invention provides a releasing dog construction for carriers or trolleys which is extremely compact and positive in action as will be seen from the following description of the representative embodiments disclosed in the accompanying drawings in which:

FIGURE 1 is a side elevation of a trolley incorporating both dog positioning and depressing members;

FIGURE 2 is a front end view of the trolley of FIG. 1 showing the same mounted on a typical track section;

FIGURE 3 is a side elevation of the rear portion of a leading trolley or carrier and the front portion of a following trolley or carrier showing the action of the dog depressing and positioning member; and FIGURE 4 is a side elevation similar to FIG. 3 but wherein the driving dog of the following trolley or carrier is mounted for vertical sliding movement between driving and non-driving positions.

Referring to FIGS. 1 and 2 the conveyor trolley 10 includes a U-shaped body portion 12 having a pair of spaced vertical side walls 13 and 14 and a lower transverse web 15. A forward wheel axle 16 and a rearward wheel axle 18 are mounted between the side walls 13 and 14, each axle being equipped with a pair of wheels 20. A pair of guide rollers 22 and 23 are mounted beneath the front and rear axles 16 and 18 and a suitable hanger bracket 24 is suspended below the trolley body member 12.

A driving dog positioning member 26 is pivotally mounted on the front wheel axle 16 between the body side walls 13 and 14, this member having a counterweight portion 28 forwardly of the wheel axle and adapted to pivot the positioning member about the axle to a normal position defined by engagement between a lower surface 29 on the counterweight portion and the transverse body web 15. In the construction of FIGS. 1–3 a driving dog 30 is formed integrally with the dog positioning member and when the member is in its normal position shown in FIG. 1, the driving dog projects upwardly for engagement by a pusher 32 of a driveline.

A dog depressing member 34 is pivotally mounted on the rear wheel axle 18 between the body side walls 13 and 14 and includes a rearwardly extending counterweighted heel portion 35 which acts to pivot the dog depressing member 34 to a normal position defined by engagement between a bottom surface 36 on the heel portion and the transverse body web 15. A forwardly extending toe portion 38 on the dog depressing member has a lower surface 39 which is engageable with the transverse web 15 for limiting pivotal movement of the dog depressing member in the opposite direction.

The dog positioning member 26 is provided with a crank portion 40 which extends generally radial to the wheel axle 16 and the dog depressing member 34 is provided with a rearwardly projecting spur or finger 42. Complementary shaped surfaces 43 and 44 are provided on the front and upper portion of the dog positioning member 26 and on the rear and lower portion of the spur of the dog depressing member 34 respectively together with a complementary surface 45 on the front of the dog positioning member 26 and 46 on the rear of the dog depressing member 34.

As shown in FIG. 3, when a leading trolley or carrier 10 is overtaken by a following trolley or carrier 10a, the surface 43 on the dog positioning member which extends forwardly and downwardly in the normal position thereof (see FIG. 1) engages and guides the spur 42 of the dog depressing member 34 into engagement with the crank portion 40, pivoting the dog positioning member to move the driving dog 30 to non-driving position as defined by overlapping abutting engagement between the complementary surfaces 43–45 on the dog positioning member and 44–46 on the dog depressing member. Both members are free to pivot to bring the complementary surfaces into this abutting overlapping relation and to thus compensate for any misalignment between the leading and following trolleys or carriers. In case the dog positioning member 26 should offer considerable resistance to movement, the dog depressing member 34 will pivot until its toe portion 38 engages the web 15 of the trolley body at which time the depressing action of the spur 42 will be augmented by the weight of the trolley 10 and any load it may be carrying.

The constructions of FIGS. 1–3 wherein the driving dog 30 is an integral part of the dog positioning member has application generally only in instances where the pusher 32 of the driveline is one of the conventional spring types which moves to a non-driving position when the driving force exceeds a given amount. This makes it practical to depress the dog 30 by pivoting it in a direction opposite to the direction of pusher movement.

FIG. 4 illustrates a modified construction suitable for use with a rigid pusher 32a. A driving dog 50 is slidably mounted between guide members 51 and 52 extending between the vertical sides 13 and 14 of the trolley body. The dog positioning member 26a is identical to that previously described except that instead of having an integral driving dog it is provided with a modified form of crank portion 40a and with means in the form of a tang 54 which projects into engagement with a recess 55 in the driving dog 50 for moving the driving dog vertically upon pivotal movement of the dog positioning member. In this FIG. 4 construction the dog depressing member 34 on the leading trolley or carrier is identical in construction and operation to that previously described.

With either form of construction engagement between the complementary surfaces of the dog depressing and positioning members results in releasing movement of the driving dog to a non-driving position defined by the overlapping abutting relation between these complementary surfaces, with the dog depressing member acting to retain the driving dog in non-driving position until the abutting relation between the complementary surfaces is disturbed. Furthermore the relatively simple construction provides extremely positive dog releasing movement under the variable conditions encountered in conveyor system operation.

While preferred embodiments have been described above in detail, it will be understood that numerous modifications might be resorted to without departing from the scope of the invention as defined in the following claims.

I claim:
1. A construction for a leading and immediately following carrier of a conveyor system of the type wherein the carriers are equipped with a driving dog movable between driving and non-driving positions relative to a pusher of a driveline, characterized by:
 (a) a dog depressing member secured to the leading carrier for movement about a pivotal axis extending transversely to the direction of carrier travel, means defining a normal position of said dog depressing member about its pivotal axis, means normally urging said dog depressing member to said normal position and means limiting movement of the said dog depressing member in an opposite direction, said dog depressing member having a finger-like portion projecting to the rear of the leading carrier with a camming surface formed on the underneath portion of said finger-like portion;
 (b) a dog positioning member mounted adjacent the front end of the following carrier for movement between driving and non-driving positions about a pivotal axis extending transversely to the direction of carrier travel, means normally urging said dog positioning member to driving position, said dog positioning member including a portion projecting forwardly of said following carrier, said forwardly projecting portion having an upper guide surface which extends forwardly and downwardly when the dog positioning member is in driving position and a crank portion projecting from the guide surface in a direction generally radial of the pivotal axis of the dog positioning member,
 (c) said guide surface of the dog positioning member being engageable by the camming surface of the dog depressing member when the following carrier overtakes a leading carrier and the end of the finger-like portion of the dog depressing member being directed by the guide surface into engagement with the crank portion of the dog positioning member to move the latter to a non-driving position defined by overlapping nested engagement between the dog depressing and positioning members.

2. A conveyor carrier construction as set forth in claim 1 further characterized by the said driving dog being formed integrally with said dog positioning member.

3. A conveyor carrier construction as set forth in claim 1 further characterized by means mounting the driving dog for vertical sliding movement on the following carrier, a recess in said driving dog and a tang extending from said dog positioning member into engagement with said recess whereby the driving dog is moved vertically upon pivotal movement of the dog positioning member.

4. A construction for a leading and an immediately following trolley of a conveyor system of the type wherein at least the following trolley is equipped with a driving dog movable between driving and non-driving positions relative to a pusher of a driveline, characterized by:
 (a) said trolleys each having a body portion including transversely spaced side walls and front and rear wheel axles extending between said side walls;
 (b) a dog depressing member pivotally mounted on the rear wheel axle of the leading trolley, the dog depressing member having a spur portion projecting to the rear of the body of the leading trolley;
 (c) a dog positioning member pivotally mounted on the front wheel axle of the following trolley for movement between driving and non-driving positions, said dog positioning member having a crank portion extending radially of the pivotal axis and an upwardly facing guide surface extending forwardly and downwardly from said crank portion and projecting beyond the front end of the following trolley;
 (d) the guide surface of the dog positioning member and the lower surface of the spur portion of the dog depressing member being complementary in shape so that when a following trolley overtakes the leading trolley the guide surface of the dog positioning member moves into engagement with the dog depressing member leading the end of the spur portion thereof into abutting relation with the crank portion of the positioning member moving the latter to a non-driving position defined by overlapping abutting engagement between the complementary surfaces of the two members.

5. A conveyor trolley of the type having a driving dog movable between driving and non-driving positions relative to a pusher of a driveline characterized by said trolley having a body including a pair of spaced vertical side walls and a transverse web connecting the lower ends of said side walls, forward and rearward wheel axles mounted between said side walls, a driving dog positioning member pivotally mounted on the forward wheel axle for moving the driving dog between said positions, said positioning member having a counterweight portion forwardly of the wheel axle and adapted to pivot the positioning member about the axle to a normal position defined by engagement between a lower surface on the counterweight portion and said transverse web, a crank portion on the dog positioning member extending generally radial to the wheel axle, a dog depressing member pivotally mounted on the rearward wheel axle and having a rearwardly extending counter weighted heel portion for pivoting the dog depressing member to a normal position defined by engagement between a bottom surface on said heel portion and the transverse web of the trolley body, a forwardly extending toe portion engageable with the transverse web for limiting pivotal movement of the dog depressing member in the opposite direction, said dog depressing member including a spur projecting rearwardly of the trolley body, and complementary shaped surfaces on the rear and lower portion of the spur of the dog depressing member and front and upper portion of the dog positioning member whereby engagement between said complementary surfaces on the dog depressing member of a leading trolley and dog positioning member of an immediately following trolley results in pivotal movement of said dog positioning member away from the said normal position thereof and in movement of the driving dog to non-driving position.

6. A conveyor trolley as claimed in claim 5 wherein the driving dog is formed integrally with the said crank portion on the dog positioning member.

7. A conveyor trolley according to claim 5 wherein the driving dog is formed integrally with the dog positioning member.

8. A conveyor trolley according to claim 5 wherein means are provided for mounting the driving dog between the side walls of the trolley body for vertical sliding movement and means are included on the dog positioning member and driving dog for moving the driving dog when the dog positioning member is pivoted.

References Cited by the Examiner
UNITED STATES PATENTS

| | | | |
|---|---|---|---|
| 2,234,620 | 3/41 | Botley | 104—193 |
| 2,619,916 | 12/52 | Rainier | 104—172 |
| 2,885,969 | 5/59 | Kay et al. | 104—172 |
| 3,044,416 | 7/62 | Reibel et al. | 104—172 |

LEO QUACKENBUSH, *Primary Examiner.*